US011315502B2

(12) United States Patent
Li et al.

(10) Patent No.: US 11,315,502 B2
(45) Date of Patent: Apr. 26, 2022

(54) BACKLIGHT DRIVE METHOD, BACKLIGHT DRIVE DEVICE, BACKLIGHT SOURCE SYSTEM, AND DISPLAY DEVICE

(71) Applicant: Shanghai Tianma Micro-Electronics Co., Ltd., Shanghai (CN)

(72) Inventors: Xiongping Li, Shanghai (CN); Xiaoping Sun, Shanghai (CN); Lihua Wang, Shanghai (CN); Conghua Ma, Shanghai (CN); Qiang Dong, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/933,335

(22) Filed: Jul. 20, 2020

(65) Prior Publication Data

US 2021/0375218 A1 Dec. 2, 2021

(30) Foreign Application Priority Data

Jun. 2, 2020 (CN) .......................... 202010488093.2

(51) Int. Cl.
*G09G 3/32* (2016.01)
*G09G 3/34* (2006.01)
*G02F 1/13357* (2006.01)
*G02F 1/1335* (2006.01)

(52) U.S. Cl.
CPC ..... *G09G 3/3406* (2013.01); *G02F 1/133603* (2013.01); *G02F 1/133611* (2013.01); *G09G 3/32* (2013.01); *G02F 1/133612* (2021.01); *G09G 2320/0233* (2013.01); *G09G 2320/064* (2013.01)

(58) Field of Classification Search
CPC ......... G09G 3/3406; G09G 2320/0233; G09G 2320/064; G09G 3/32; G02F 1/133603; G02F 1/133611; G02F 1/133612
USPC ........................................................ 345/690
See application file for complete search history.

(56) References Cited

U.S. PATENT DOCUMENTS

2014/0160180 A1* 6/2014 Oda .......................... G09G 3/32
345/690

FOREIGN PATENT DOCUMENTS

| CN | 102402942 A | 4/2012 |
|---|---|---|
| CN | 102800301 A | 11/2012 |

(Continued)

*Primary Examiner* — Abdul-Samad A Adediran
(74) *Attorney, Agent, or Firm* — Anova Law Group, PLLC

(57) ABSTRACT

A backlight drive method, a backlight drive device, a backlight source system, and a display device are provided in the present disclosure. The backlight drive method is used to drive a light-emitting region of a backlight source of the display device. Driving the light-emitting region of the backlight source includes acquiring actual ambient brightness of an ambient where the display device is located. Driving the light-emitting region of the backlight source further includes determining a target backlight brightness range of light exited from the light-emitting region with reference to the actual ambient brightness, where the target backlight brightness range is within an intrinsic brightness range of the light-emitting region. Driving the light-emitting region of the backlight source further includes matching the target backlight brightness range to a plurality of gray levels preset in the light-emitting region.

19 Claims, 12 Drawing Sheets

(56) References Cited

FOREIGN PATENT DOCUMENTS

| CN | 108833814 A | 11/2018 |
|---|---|---|
| CN | 109326250 A | 2/2019 |

\* cited by examiner

BACKLIGHT DRIVE METHOD, BACKLIGHT DRIVE DEVICE, BACKLIGHT SOURCE SYSTEM, AND DISPLAY DEVICE

CROSS-REFERENCE TO RELATED APPLICATION

This application claims the priority of Chinese Patent Application No. 202010488093.2, filed on Jun. 2, 2020, the content of which is incorporated herein by reference in its entirety.

TECHNICAL FIELD

The present disclosure generally relates to the field of display technology and, more particularly, relates to a backlight drive method, a backlight drive device, a backlight source system, and a display device.

BACKGROUND

In current era of rapid communication development, display devices, such as mobile phones, personal digital assistants, or smart phones, have become essential electronic products in people's lives. Existing display devices are mostly liquid crystal displays (LCD) which have been widely used because of their unique features including thin body, low energy consumption, no radiation, and the like. Most of the liquid crystal displays on the market includes a backlight-type liquid crystal display, which include a liquid crystal display panel and a backlight module. The working principle of the liquid crystal display panel includes disposing liquid crystal molecules in two parallel transparent substrates and controlling the twist of the liquid crystal molecules to refract the light from the backlight module to form images. The backlight brightness range of the light-emitting region of the existing backlight module may be fixed and non-adjustable, which may reduce the adjustment flexibility of the light-emitting region.

SUMMARY

One aspect of the present disclosure provides a backlight drive method for driving a backlight source of a drive device. The backlight drive method includes driving a light-emitting region of the backlight source. Driving the light-emitting region of the backlight source includes acquiring actual ambient brightness of an ambient where the display device is located. Driving the light-emitting region of the backlight source further includes determining a target backlight brightness range of light exited from the light-emitting region with reference to the actual ambient brightness, where the target backlight brightness range is within an intrinsic brightness range of the light-emitting region. Driving the light-emitting region of the backlight source further includes matching the target backlight brightness range to a plurality of gray levels preset in the light-emitting region.

Another aspect of the present disclosure provides a backlight drive device, configured to drive a backlight source of a display device. The backlight drive device includes a first acquiring unit, a first determining unit, and a processing unit. The first acquiring unit is configured to acquire actual ambient brightness of an ambient where the display device is located. The first determining unit is configured to determine a target backlight brightness range of light exited from the light-emitting region with reference to the actual ambient brightness, where the target backlight brightness range is within an intrinsic brightness range of the light-emitting region. The processing unit is configured to match the target backlight brightness range to a plurality of gray levels preset in the light-emitting region.

Another aspect of the present disclosure provides a backlight source system including the above-mentioned backlight drive device. The backlight drive device includes a first acquiring unit, a first determining unit, and a processing unit. The first acquiring unit is configured to acquire actual ambient brightness of an ambient where the display device is located. The first determining unit is configured to determine a target backlight brightness range of light exited from the light-emitting region with reference to the actual ambient brightness, where the target backlight brightness range is within an intrinsic brightness range of the light-emitting region. The processing unit is configured to match the target backlight brightness range to a plurality of gray levels preset in the light-emitting region.

Another aspect of the present disclosure provides a display device including the above-mentioned backlight source system which includes the above-mentioned backlight drive device. The backlight drive device includes a first acquiring unit, a first determining unit, and a processing unit. The first acquiring unit is configured to acquire actual ambient brightness of an ambient where the display device is located. The first determining unit is configured to determine a target backlight brightness range of light exited from the light-emitting region with reference to the actual ambient brightness, where the target backlight brightness range is within an intrinsic brightness range of the light-emitting region. The processing unit is configured to match the target backlight brightness range to a plurality of gray levels preset in the light-emitting region.

Other aspects of the present disclosure can be understood by those skilled in the art in light of the description, the claims, and the drawings of the present disclosure.

BRIEF DESCRIPTION OF THE DRAWINGS

In order to more clearly explain the embodiments of the present disclosure or the technical solutions in the existing technology, the drawings required for describing the embodiments or the existing technology are briefly introduced hereinafter. Obviously, the drawings in the following description are merely embodiments of the present disclosure. Other drawings may also be obtained by those skilled in the art without any creative work according to provided drawings.

DETAILED DESCRIPTION

The technical solutions in the embodiments of the present disclosure are described clearly and completely in conjunction with the drawings in the embodiments of the present disclosure. Obviously, the described embodiments are merely a part of the embodiments of the present disclosure, but not all the embodiments. Based on the embodiments of the present disclosure, all other embodiments obtained by those skilled in the art without creative work fall within the protection scope of the present disclosure.

Most of the liquid crystal displays on the market includes a backlight-type liquid crystal display, which include a liquid crystal display panel and a backlight module. The working principle of the liquid crystal display panel includes disposing liquid crystal molecules in two parallel transparent substrates and controlling the twist of the liquid crystal molecules to refract the light from the backlight module to form images. The backlight brightness range of the light-emitting region of the existing backlight module may be fixed and non-adjustable, which may reduce the adjustment flexibility of the light-emitting region.

The embodiments of the present disclosure provide a backlight drive method, a backlight drive device, a backlight source system, and a display device, which may effectively solve the technical problems in the existing technology, optimize the backlight brightness range of the light exited from the light-emitting region under the actual ambient brightness, and improve the adjustment flexibility of the backlight brightness range of the light-emitting region.

To achieve the above-mentioned objectives, the technical solutions provided by exemplary embodiments of the present disclosure are described in detail with reference to FIGS. 1-18.

Figure 1:
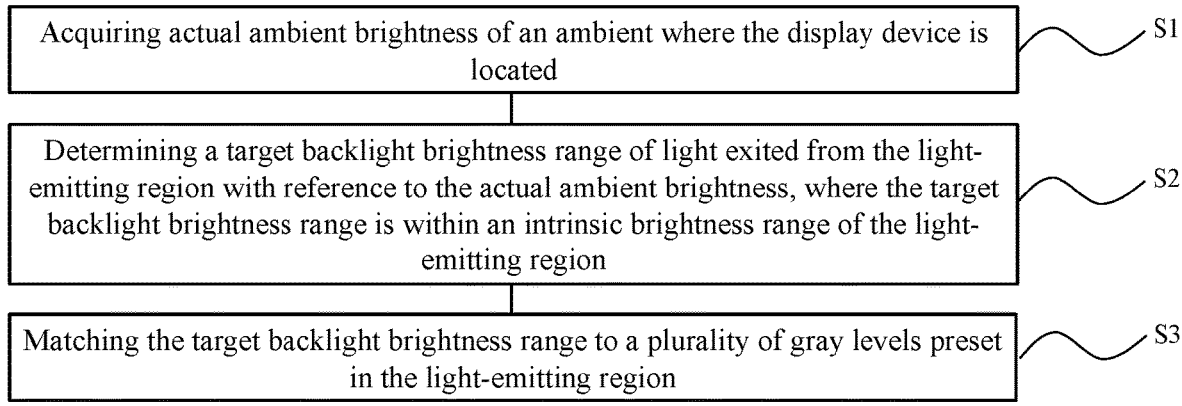
FIG. 1 illustrates a flow chart of a backlight drive method according to exemplary embodiments of the present disclosure.

Referring to FIG. 1, FIG. 1 illustrates a flow chart of a backlight drive method according to exemplary embodiments of the present disclosure, where the drive method may be used to drive a light-emitting region of a backlight source of a display device. Driving the light-emitting region of the backlight source may include the following steps.

At S1, actual ambient brightness of an ambient where the display device is located may be acquired.

At S2, a target backlight brightness range of light exited from the light-emitting region may be determined with reference to the actual ambient brightness, where the target backlight brightness range may be within the intrinsic brightness range of the light-emitting region.

At S3, the target backlight brightness range may be matched to a plurality of gray levels preset in the light-emitting region.

It should be noted that the intrinsic brightness range of the light-emitting region provided by the embodiments of the present disclosure may be a set maximum light-emitting brightness range of the light-emitting region, which may be determined according to parameters, such as the type of the light-emitting element forming the light-emitting region and the like. The brightness value of the light-emitting region may not be limited by the present disclosure and may be the intrinsic brightness at shipment.

In one embodiment of the present disclosure, the actual ambient brightness provided by the present disclosure may be obtained by multiplexing a sensing device, such as a brightness sensor configured by the display device itself, and the like. The actual ambient brightness may also be the brightness of the ambient light obtained by a sensing device, such as a brightness sensor configured independently, and the like.

It should be understood that the backlight drive solution provided by the embodiments of the present disclosure may adjust the backlight brightness range of the light-emitting region by referring to the actual ambient brightness, and further optimize the backlight brightness range of the light exited from the light-emitting region under the actual ambient brightness, which may ensure a high light-exiting brightness effect of the ambient where the display device is located, improve the adjustment flexibility of the backlight brightness range of the light-emitting region, and achieve the objective of self-adaptive adjustment of the backlight brightness range of the light exited from the light-emitting region according to the actual ambient brightness.

Figure 2:
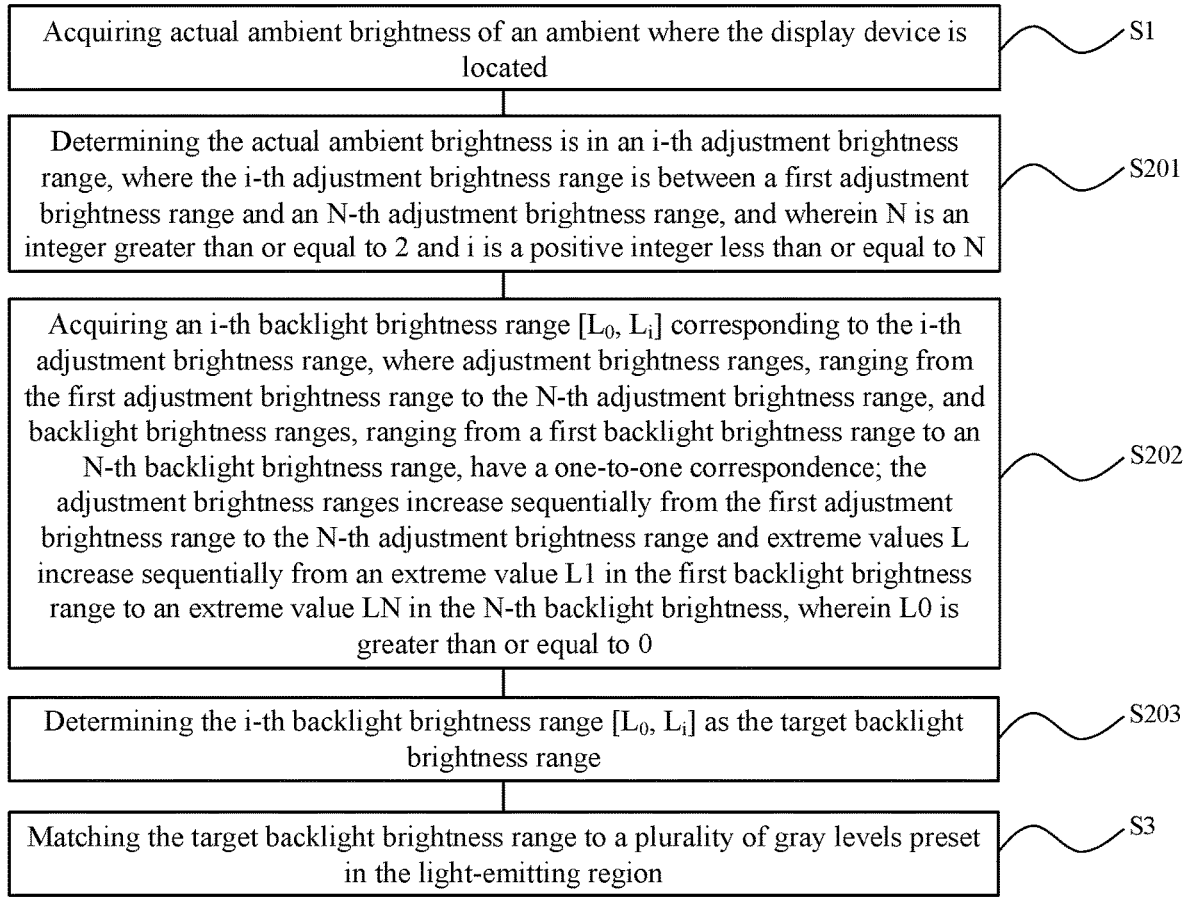
FIG. 2 illustrates a flow chart of another backlight drive method according to exemplary embodiments of the present disclosure.

In one embodiment of the present disclosure, when determining the target backlight brightness range with reference to the actual ambient brightness, different backlight brightness ranges corresponding to different ambient brightness adjustment levels may be preset by the present disclosure, and the ambient brightness adjustment level with which the actual ambient brightness falls may be determined, thereby determining the backlight brightness range corresponding to the ambient brightness adjustment level as the target backlight brightness range. Referring to FIG. 2, FIG. 2 illustrates a flow chart of another backlight drive method according to exemplary embodiments of the present disclosure. Driving the light-emitting region of the backlight source may include the following steps.

At S1, the actual ambient brightness of the ambient where the display device is located may be acquired.

At S2, the target backlight brightness range of the light exited from the light-emitting region may be determined with reference to the actual ambient brightness, where the target backlight brightness range may be within the intrinsic brightness range of the light-emitting region.

At S3, the target backlight brightness range may be matched to a plurality of gray levels preset in the light-emitting region.

The step S2 where the target backlight brightness range of the light exited from the light-emitting region may be determined with reference to the actual ambient brightness may include the following steps.

At S201, the actual ambient brightness may be determined in an i-th adjustment brightness range, where the i-th adjustment brightness range is between a first adjustment brightness range and an N-th adjustment brightness range. N is an integer greater than or equal to 2, and i is a positive integer less than or equal to N.

At S202, an i-th backlight brightness range [L0, Li] corresponding to the i-th adjustment brightness range may be acquired. Adjustment brightness ranges, ranging from the first adjustment brightness range to the N-th adjustment brightness range, and backlight brightness ranges, ranging from a first backlight brightness range to an N-th backlight brightness range, have a one-to-one correspondence. The adjustment brightness ranges increase sequentially from the first adjustment brightness range to the N-th adjustment brightness range and extreme values L increase sequentially from an extreme value L1 in the first backlight brightness range to an extreme value $L_N$ in the N-th backlight brightness, where L0 is greater than or equal to 0.

At S203, the i-th backlight brightness range $[L_0, L_i]$ may be determined as the target backlight brightness range.

It should be noted that the interval $[L_0, L_i]$ provided by the embodiments of the present disclosure may be the i-th backlight brightness range. The brightness value of $L_0$ may be less than the brightness value of $L_i$, and $L_0$ may be an integer greater than or equal to 0. In the embodiments of the present disclosure, the brightness value of $L_0$ may be set to be 0 or be greater than 0, and the optimal brightness value may be determined according to means, such as pre-shipment test and the like.

It should be understood that the first adjustment brightness range to the N-th adjustment brightness range provided by the embodiments of the present disclosure may be equivalent to the ambient brightness adjustment levels; each adjustment brightness range may correspond to a backlight brightness range; and a final target backlight brightness range may be determined by determining the adjustment brightness range within which the actual ambient brightness falls.

Taking N=3 as example, a first adjustment bright range to a third adjustment brightness range may be set to correspond to a low ambient brightness level, a medium ambient brightness level, and a high ambient brightness level; if the intrinsic backlight brightness range of the light-emitting region is [0, 1000 nits], a first backlight brightness range may be set as [0, 300 nits], a second backlight brightness range may be set as [0, 500 nits], and a third backlight brightness range may be set as [0, 1000 nits]; after acquiring the actual ambient brightness, it may determine that the actual ambient brightness falls within the lower ambient brightness level; furthermore, the first backlight brightness range [0, 300 nits] may be determined to be the target backlight brightness range, and then the target backlight brightness range of [0, 300 nits] may be matched to a plurality of gray levels preset in the light-emitting region. If the acquired actual ambient brightness changes again, the target backlight brightness range may be re-determined according to updated actual ambient brightness, and then the newly determined target backlight brightness range may be re-matched to the plurality of gray levels preset in the light-emitting region.

Figure 3:
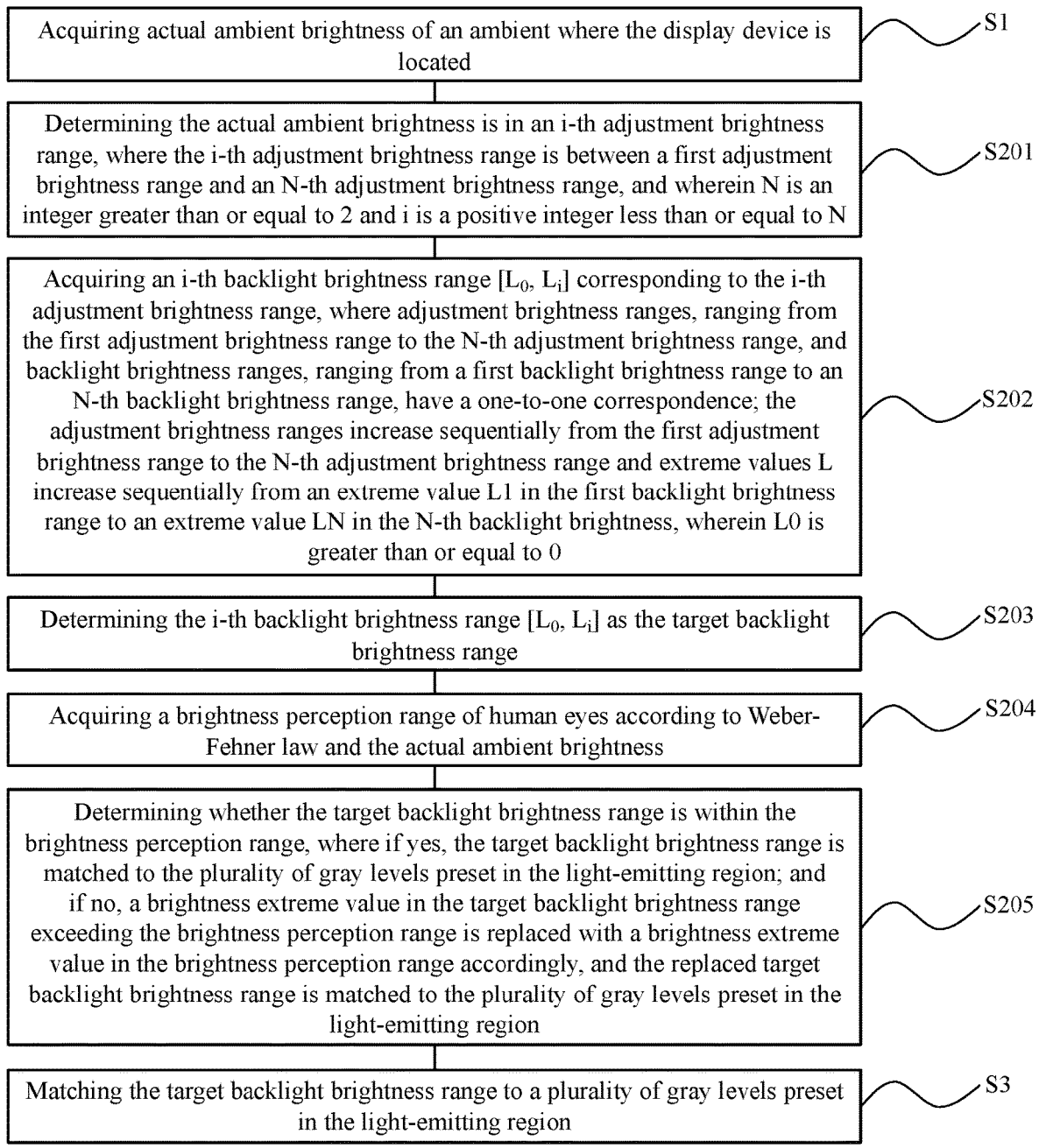
FIG. 3 illustrates a flow chart of another backlight drive method according to exemplary embodiments of the present disclosure.

In one embodiment of the present disclosure, after determining the target backlight brightness range by determining the ambient brightness adjustment level with which the actual ambient brightness falls, the target backlight brightness range may also be verified to determine whether it fits human eye visual characteristics, which may ensure that the reproduced image and the original image have a same contrast and a same brightness level for the human eyes under different ambient light, thereby providing same display experience. Referring to FIG. 3, FIG. 3 illustrates a flow chart of another backlight drive method according to exemplary embodiments of the present disclosure. Driving the light-emitting region of the backlight source may include the following steps.

At S1, the actual ambient brightness of the ambient where the display device is located may be acquired.

At S2, the target backlight brightness range of the light exited from the light-emitting region may be determined with reference to the actual ambient brightness, where the target backlight brightness range may be within the intrinsic brightness range of the light-emitting region.

At S3, the target backlight brightness range may be matched to a plurality of gray levels preset in the light-emitting region.

The step S2 where the target backlight brightness range of the light exited from the light-emitting region may be determined with reference to the actual ambient brightness may include the following steps.

At S201, the actual ambient brightness may be determined in an i-th adjustment brightness range, where the i-th adjustment brightness range is between a first adjustment brightness range and an N-th adjustment brightness range. N is an integer greater than or equal to 2, and i is a positive integer less than or equal to N.

At S202, an i-th backlight brightness range [L0, Li] corresponding to the i-th adjustment brightness range may be acquired. Adjustment brightness ranges, ranging from the first adjustment brightness range to the N-th adjustment brightness range, and backlight brightness ranges, ranging from a first backlight brightness range to an N-th backlight brightness range, have a one-to-one correspondence. The adjustment brightness ranges increase sequentially from the first adjustment brightness range to the N-th adjustment brightness range and extreme values L increase sequentially from an extreme value L1 in the first backlight brightness range to an extreme value $L_N$ in the N-th backlight brightness, where L0 is greater than or equal to 0.

At S203, the i-th backlight brightness range $[L_0, Li]$ may be determined as the target backlight brightness range.

And, after determining the target backlight brightness range at step S2 and before matching the target backlight brightness range to the plurality of gray levels preset in the light-emitting region, the method may further include the following steps.

At S204, a brightness perception range of human eyes may be acquired according to Weber-Fehner law and the actual ambient brightness.

At S205, whether the target backlight brightness range is within the brightness perception range may be determined. If yes, the target backlight brightness range may be matched to the plurality of gray levels preset in the light-emitting region. If no, a brightness extreme value in the target backlight brightness range exceeding the brightness perception range may be replaced with a brightness extreme value in the brightness perception range accordingly, and the replaced target backlight brightness range may be matched to the plurality of gray levels preset in the light-emitting region.

It should be understood that the relative brightness perception of the human eyes for a same actual brightness is different in different brightness ambient. Therefore, the brightness perception range of the human eyes may be obtained by Weber-Fehner law and the actual ambient brightness, and whether the minimum brightness and the maximum brightness in the target backlight brightness range exceed the brightness perception range may be determined. If not, the target backlight brightness range may be determined to fit the perception brightness of the human eyes, and the current target backlight brightness range may be matched to the plurality of gray levels in the light-emitting region. If the minimum brightness in the target backlight brightness range exceeds the brightness perception range, the minimum brightness in the target backlight brightness range may be replaced with the minimum brightness in the brightness perception range; if the maximum brightness in the target backlight brightness range exceeds the brightness perception range, the maximum brightness in the target backlight brightness range may be replaced with the minimum brightness in the brightness perception range; and the updated target backlight brightness range may be matched to the plurality of gray levels in the light-emitting region.

Figure 4:
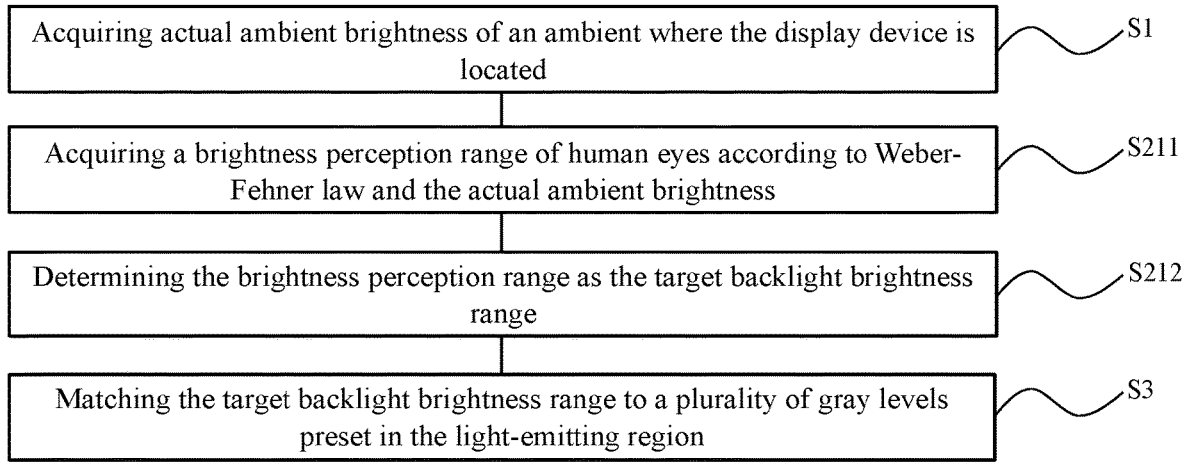
FIG. 4 illustrates a flow chart of another backlight drive method according to exemplary embodiments of the present disclosure.

In one embodiment of the present disclosure, the brightness distribution range of the human eyes may be directly determined as the target backlight brightness range. Referring to FIG. 4, FIG. 4 illustrates a flow chart of another backlight drive method according to exemplary embodiments of the present disclosure. Driving the light-emitting region of the backlight source may include the following steps.

At S1, the actual ambient brightness of the ambient where the display device is located may be acquired.

At S2, the target backlight brightness range of the light exited from the light-emitting region may be determined with reference to the actual ambient brightness, where the target backlight brightness range may be within the intrinsic brightness range of the light-emitting region.

At S3, the target backlight brightness range may be matched to a plurality of gray levels preset in the light-emitting region.

The step S2 of determining the target backlight brightness range of the light exited from the light-emitting region with reference to the actual ambient brightness may include the following steps.

At S211, the brightness perception range of the human eyes may be acquired according to Weber-Fehner law and the actual ambient brightness.

At S212, the brightness perception range may be determined as the target backlight brightness range.

In one embodiment of the present disclosure, the brightness perception range of the human eyes may be acquired according to Weber-Fehner law and the actual ambient brightness. For example, the brightness perception range may be calculated according to the formula $S_{perception}=*lgB+K_0$, where $S_{perception}$ is perception brightness, B is actual ambient brightness, and K and $K_0$ are setting constants. By setting the maximum and minimum values of two constants K and $K_0$, the maximum brightness and the minimum brightness of $S_{perception}$ may be calculated finally, thereby obtaining the corresponding brightness perception range.

It should be understood that the relative brightness perception of the human eyes for a same actual brightness is different in different brightness ambient. Therefore, the brightness perception range of the human eyes may be obtained by Weber-Fehner law and the actual ambient brightness, and the brightness perception range may be determined as the target backlight brightness range corresponding to the light-emitting region at the current target ambient brightness. For example, when the actual ambient brightness acquired during the daytime is 10,000 nits, the brightness perception range of the human eyes obtained by Weber-Fehner law and the actual ambient brightness may be [200 nits-20000 nits], and then the brightness perception range [200 nits-20000 nits] may be determined as the target backlight brightness range to match the plurality of gray levels of the light-emitting region; when the actual ambient brightness acquired during the nighttime is 30 nits, the brightness perception range of the human eyes obtained by Weber-Fehner law and the actual ambient brightness may be [1 nit-200 nits], and then the brightness perception range [1 nit-200 nits] may be determined as the target backlight brightness range to match the plurality of gray levels of the light-emitting region.

Figure 5:
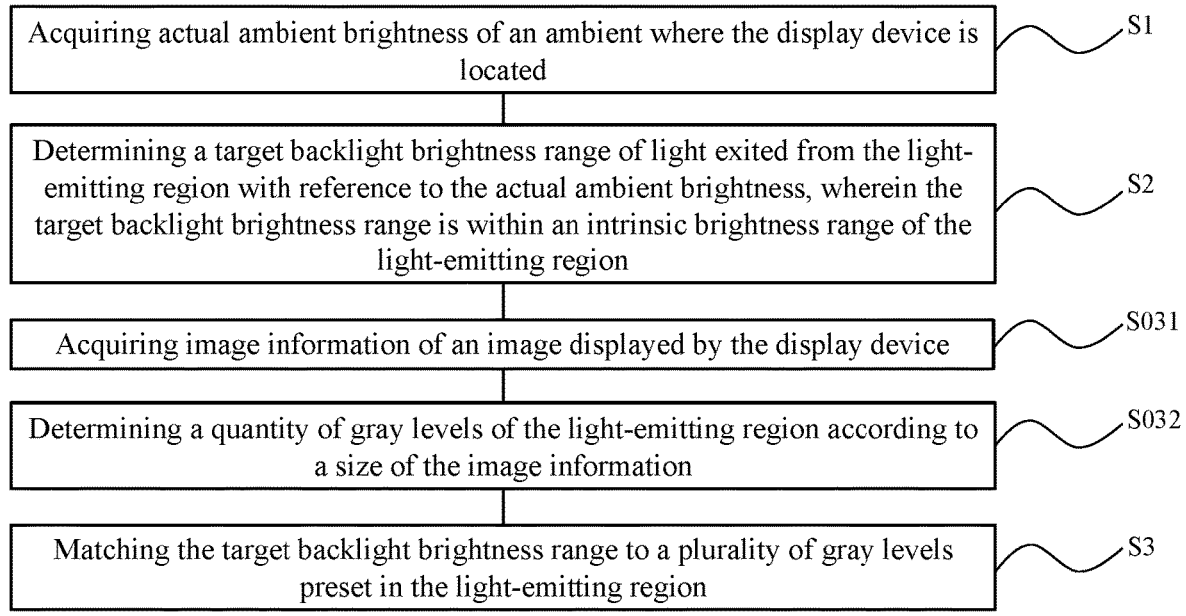
FIG. 5 illustrates a flow chart of another backlight drive method according to exemplary embodiments of the present disclosure.

In one embodiment of the present disclosure, the plurality of preset gray levels of the light-emitting region provided by the present disclosure may be a preset fixed-number gray levels, that is, the quantity of gray levels may not change with factors, such as the target backlight brightness range and the like. Or, the quantity of the plurality of preset gray levels may be divided according to the maximum brightness in the target backlight brightness range; the greater the maximum brightness in the target backlight brightness range is, the greater the quantity of gray levels is. For example, the mapping relationship between different backlight brightness ranges and the quantity of gray levels may be preset; after determining the target backlight brightness range in different backlight brightness ranges, the quantity of gray levels corresponding to the target backlight brightness range may be determined. Or, the quantity of the plurality of preset gray levels may also be dynamically adjusted according to different displayed images. Referring to FIG. 5, FIG. 5 illustrates a flow chart of another backlight drive method according to exemplary embodiments of the present disclosure. Driving the light-emitting region of the backlight source may include the following steps.

At S1, the actual ambient brightness of the ambient where the display device is located may be acquired.

At S2, the target backlight brightness range of the light exited from the light-emitting region may be determined with reference to the actual ambient brightness, where the target backlight brightness range may be within the intrinsic brightness range of the light-emitting region.

At S3, the target backlight brightness range may be matched to the plurality of gray levels preset in the light-emitting region.

Before the step S3 of matching the target backlight brightness range to the plurality of gray levels preset in the light-emitting region, the method may further include the following steps.

At S031, the image information of the image displayed by the display device may be acquired.

At S032, the quantity of gray levels of the light-emitting region may be determined according to the size of the image information.

The process of determining the quantity of gray levels provided by the embodiments of the present disclosure may be performed after determining the target brightness range and before matching the target backlight brightness range to the plurality of preset gray levels of the light-emitting region. The quantity of gray levels corresponding to the light-emitting region may be determined by judging the complexity of the image displayed in the portion of the display device corresponding to the light-emitting region. That is, the image information of the image displayed in the display device corresponding to the light-emitting region may be judged, and the quantity of gray levels of the light-emitting region may be determined according to the size of image information. The quantity of gray levels of the light-emitting region may be positively correlated with the size of image information. The more the image information is, the more the quantity of gray levels is; and the less the image information is, the less the quantity of gray levels is. If the image displayed in the display device corresponding to the light-emitting region may only be an arrow indicator, the image information may be relatively small, such that a relatively small quantity of gray levels may be set. For example, the quantity of gray levels may be 32 or less. If the image displayed in the display device corresponding to the light-emitting region may only be a navigation image and the like, the image information may be relatively large, such that a relatively large quantity of gray levels may be set. For example, the quantity of gray levels may be 256 or more.

In one embodiment of the present disclosure, the mapping relationship between the size of the image information and the quantity of the gray levels may be preset in the present disclosure. Furthermore, the mapping relationship may be searched through means including table look-up and the like to determine the quantity of the gray levels corresponding to the image information, thereby improving efficiency.

It should be understood that the quantity of the gray levels provided by the embodiments of the present disclosure may be divided according to the maximum brightness of the target backlight brightness range or the size of the image information, thereby being capable of optimizing the quantity of the gray levels in the current target backlight brightness range; and on the basis of adaptively adjusting the target backlight brightness range according to the actual ambient brightness, the drive solution may be capable of adaptively adjusting the quantity of the gray levels to further improve the backlight drive effect.

The quantity of the gray levels of the light-emitting region provided by the embodiments of the present disclosure may not be infinitely increased and may require analysis by combining factors, such as the type and the drive method of the light-emitting element, and the like. For example, the light-emitting element provided by the embodiments of the present disclosure may be driven by a pulse modulation signal. The pulse width time of the pulse modulation signal is linearly related to the brightness of the light-emitting element. That is, the longer the light-emitting element is turned on, the greater the brightness is. Furthermore, the quantity of the gray levels may be determined according to the total pulse width time and the stepwise pulse width time of the pulse modulation signal. The pulse width unit may be in the order of microseconds or milliseconds. For example, the total pulse width time of the pulse modulation signal may be 256 microseconds, and the stepwise pulse width may be 1 microsecond, such that the maximum quantity of the gray levels may be 256. Otherwise, the corresponding pulse width time difference between two adjacent gray levels may be less than 1 microsecond, so that the brightness between two adjacent gray levels may not be differentiated.

Figure 6:
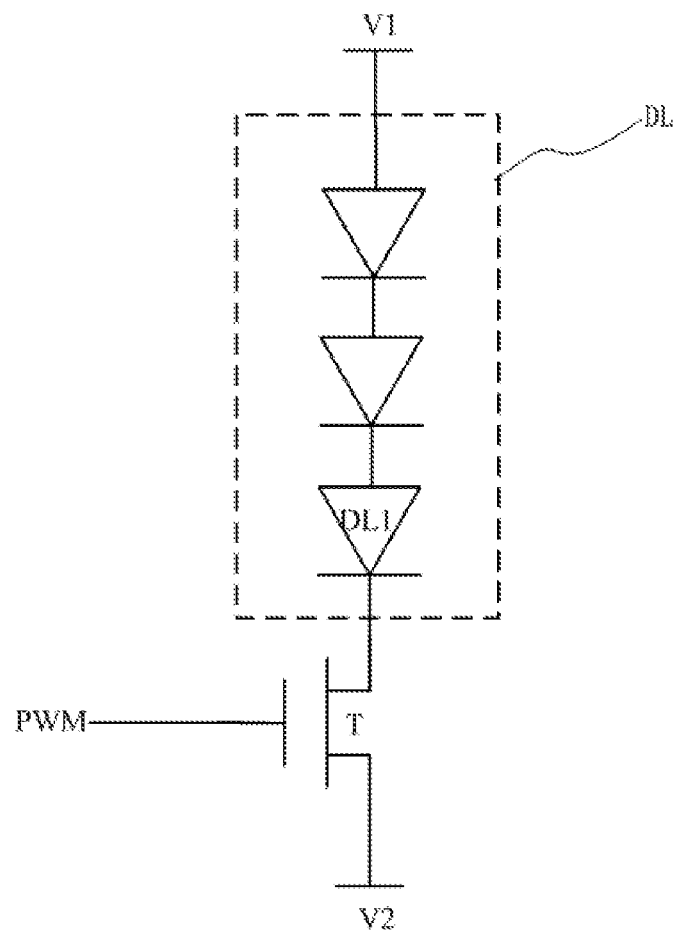
FIG. 6 illustrates a structural schematic of a light-emitting region according to exemplary embodiments of the present disclosure.
Figure 7:
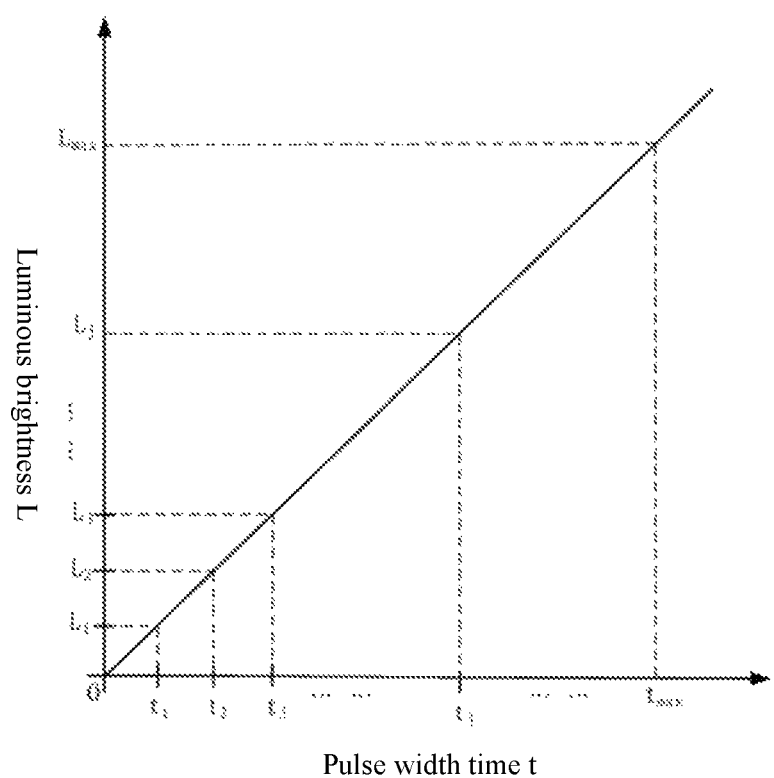
FIG. 7 illustrates a relationship schematic between pulse width time and luminous brightness according to exemplary embodiments of the present disclosure.

A light-emitting element group and its drive circuit provided by the embodiments of the present disclosure are described with reference to the drawings in detail hereinafter. Referring to FIG. 6, FIG. 6 illustrates a structural schematic of the light-emitting region according to exemplary embodiments of the present disclosure. The light-emitting region may include one switch transistor T and one light-emitting element group DL. The light-emitting element group DL may include at least one light-emitting element DL1. A first electrode of the light-emitting element group DL may be electrically connected to a first voltage V1, and a second electrode of the light-emitting element group DL may be electrically connected to a first terminal of the switch transistor T. A second terminal of the switch transistor T may be electrically connected to a second voltage V2, and a gate electrode of the switch transistor T may be electrically connected to a pulse modulation signal PWM. The pulse width time of the pulse modulation signal PWM may have a linear relationship with the brightness of the light-emitting element group DL (e.g., the schematic of the linear relationship between the pulse width time and the brightness shown in FIG. 7). The method for implementing respective brightness corresponding to the plurality of gray levels may include that brightness corresponding to each of the plurality of gray levels is realized by controlling different pulse width times of the pulse modulation signal PWM.

Figure 8:
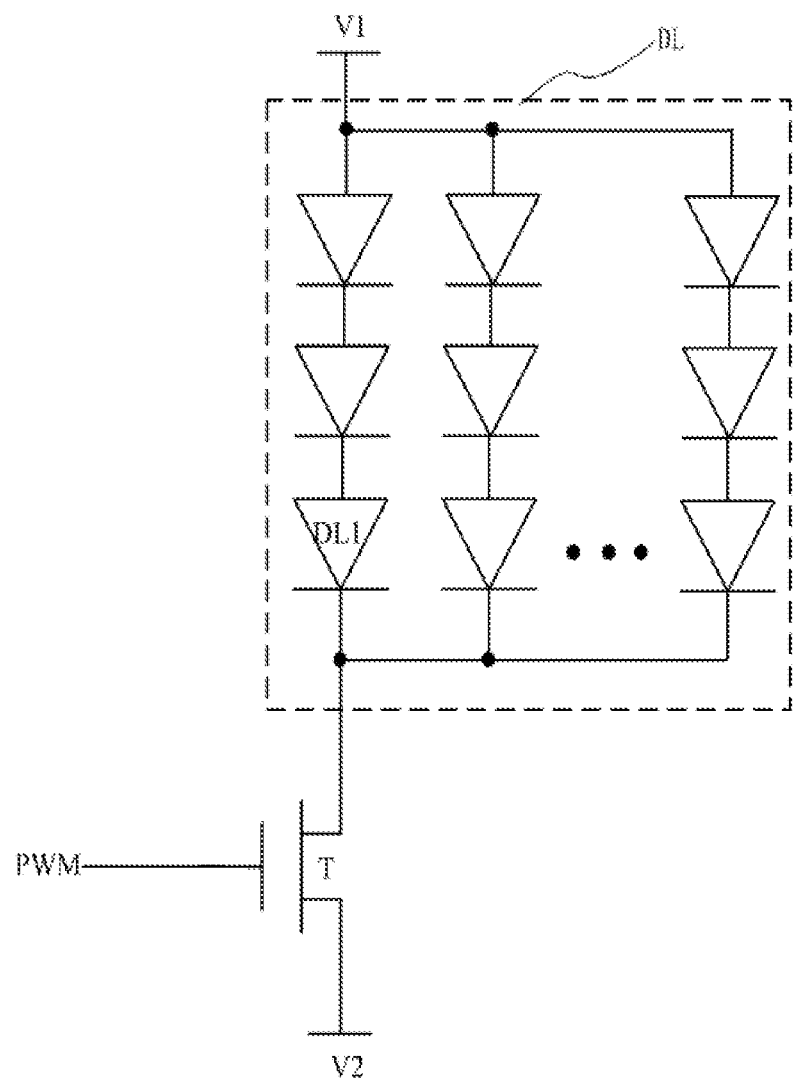
FIG. 8 illustrates a structural schematic of another light-emitting region according to exemplary embodiments of the present disclosure.

As shown in FIG. 6, when the light-emitting element group DL provided by the embodiments of the present disclosure includes a plurality of light-emitting elements DL1, the plurality of light-emitting elements DL1 may be electrically connected in series. Or, as shown in FIG. 8, FIG. 8 illustrates a structural schematic of another light-emitting region according to exemplary embodiments of the present disclosure. When the light-emitting element group includes the plurality of light-emitting elements DL1, the plurality of the light-emitting elements DL1 may be divided into a plurality of groups, all groups may be electrically connected in parallel, and the light-emitting elements DL1 in each group may be electrically connected in series, which may not be limited according to the embodiments of the present disclosure. The light-emitting elements DL1 in the light-emitting element group DL may also be connected using other electrical connection manners, which may require specific design according to actual applications.

It should be understood that the pulse width time of the pulse modulation signal provided by the embodiments of the present disclosure may have the linear relationship with the brightness of the light-emitting element. That is, the luminous brightness of the light-emitting element=k* the pulse width time of the pulse modulation signal, where k is a positive number. Furthermore, the luminous brightness of the light-emitting element may be adjusted by controlling the pulse width time of the pulse modulation signal, thereby implementing the objective that the corresponding brightness of different gray levels in the light-emitting region may be adjusted by the adjusted pulse width time. For example, the correspondence relationship between the luminous brightness and the pulse width time of the light-emitting element group may be shown in FIG. 7, where $t_{max}$ is the maximum pulse width time, $L_{max}$ is the luminous brightness corresponding to the maximum pulse width time, and $t_j$ belongs to $t_{max}$. If the target backlight brightness range is determined to be $[0, L_j]$, the target backlight brightness range $[0, L_j]$ may be matched to the preset plurality of gray levels. The quantity of the gray levels may need to be determined with reference to the total pulse width time $t_j$ and the stepwise pulse width time, which may ensure that the absolute value of the difference in pulse width time of the brightness values corresponding to two adjacent gray levels is a positive integer multiple of the stepwise pulse width time. For example, when the target backlight brightness range is [0, $L_{max}$], the target backlight brightness range [0, $L_{max}$] may be subdivided into 256 gray levels or other matching gray levels at this point; and when the target backlight brightness range is [0, $L_j$], the target backlight brightness range [0, $L_j$] may also be subdivided into 256 gray levels or other matching gray levels at this point.

In one embodiment of the present disclosure, the switch transistor may be a metal-oxide-semiconductor (MOS) switch transistor or a thin-film field effect switch transistor (TFT), and the like. The light-emitting element may be a light-emitting diode and the like. For example, the light-emitting element may be a mini-LED or micro-LED. The plurality of the light-emitting elements included in the light-emitting region may be arranged in any manner, which may not be limited according to the embodiments of the present disclosure. The first electrode of the light-emitting element group provided in the embodiments of the present disclosure may be an anode, and the provided first voltage V1 may be the PVDD terminal; the second electrode of the light-emitting element group may be a cathode, and the provided second voltage V2 may be the PVEE terminal. The first voltage may be greater than the second voltage. The first voltage and the second voltage may be provided by an external power supply, and the pulse modulation signal PWM may be provided by a drive chip.

Figure 9:
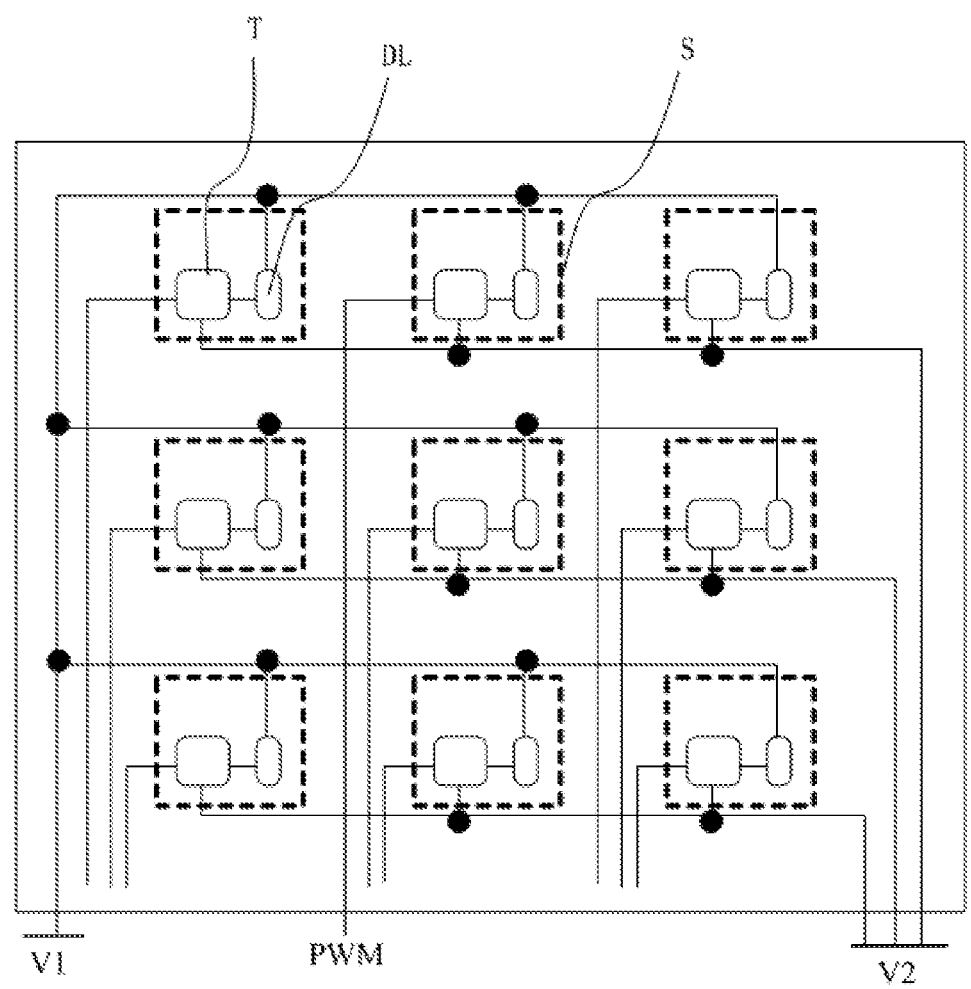
FIG. 9 illustrates a structural schematic of a backlight source according to exemplary embodiments of the present disclosure.

Furthermore, the backlight source provided by the embodiments of the present disclosure may include more light-emitting regions, and each light-emitting region may be independently controlled, such that the objective of light-emitting region division of the backlight source and independent divided region control may be implemented, thereby improving the flexibility of the backlight source to drive light-emitting. Referring to FIG. 9, FIG. 9 illustrates a structural schematic of the backlight source according to exemplary embodiments of the present disclosure. The backlight source may include a plurality of light-emitting regions S which may be arranged in an M*N array. Each light-emitting region may include the structure shown in FIG. 6 or FIG. 8, and an independent pulse modulation signal PWM may be connected to each light-emitting region S. Therefore, by controlling different pulse modulation signals PWM, the objective of light-emitting region division and independent divided region control may be implemented, the objective of reducing the brightness of the light-emitting region corresponding to the portion required to display a low brightness picture may be implemented, and the objective of increasing the brightness of the light-emitting region corresponding to the portion required to display a high brightness picture may also be implemented. For example, the backlight source provided by the present disclosure may include the plurality of the light-emitting regions, and the drive method of the plurality of the light-emitting regions may include that all light-emitting regions are independently driven by controlling the respective pulse modulation signals connected to the switch transistors of all light-emitting regions accordingly.

Figure 10:
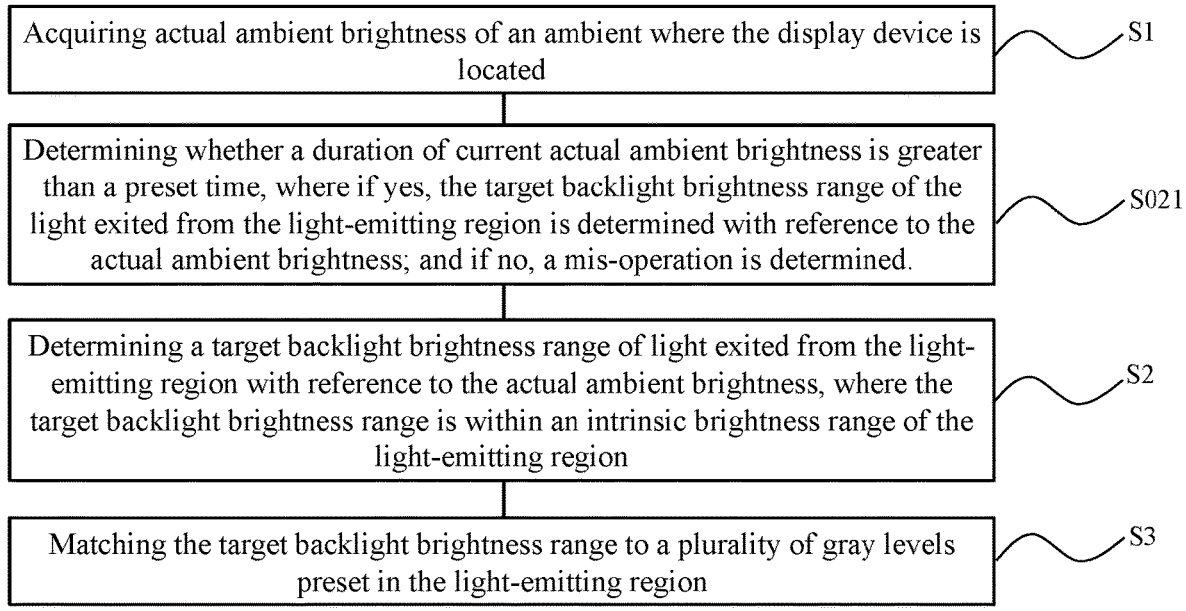
FIG. 10 illustrates a flow chart of another backlight drive method according to exemplary embodiments of the present disclosure.

Referring to FIG. 10, FIG. 10 illustrates a flow chart of another backlight drive method according to exemplary embodiments of the present disclosure. Driving the light-emitting region of the backlight source may include the following steps.

At S1, the actual ambient brightness of the ambient where the display device is located may be acquired.

At S2, the target backlight brightness range of the light exited from the light-emitting region may be determined with reference to the actual ambient brightness, where the target backlight brightness range may be within the intrinsic brightness range of the light-emitting region.

At S3, the target backlight brightness range may be matched to the plurality of gray levels preset in the light-emitting region.

After the step S1 of acquiring the actual ambient brightness and before the step S2 of determining the target backlight brightness range, the method may further include the following step.

At S021, whether the duration of the current actual ambient brightness is greater than a preset time may be determined. If yes, the target backlight brightness range of the light-emitting region may be determined with reference to the actual ambient brightness. If no, a mis-operation may be determined.

It should be understood that, after acquiring the actual ambient brightness, the backlight drive method provided by the present disclosure may determine the duration of the actual ambient brightness. If the duration is determined to be greater than the preset time, it may be determined that the ambient where the display device is located has changed, and corresponding subsequent steps of the backlight drive method may be performed. If the duration is determined to be not greater than the preset time, it may be determined that a user holding the display device may experience a short time of ambient change or other mis-operations, and the like on the display device, such that the mis-operation may be determined and the current state of the display device may be unchanged.

In one embodiment of the present disclosure, after determining the target backlight brightness range, the target backlight brightness range may need to be matched to the plurality of gray levels to form the gray level-brightness mapping relationship. An interpolation method may be used to form the gray level-brightness mapping relationship in one embodiment of the present disclosure. That is, matching the target backlight brightness range to the plurality of gray levels preset in the light-emitting region may include matching the target backlight brightness range to the plurality of gray levels preset in the light-emitting region through the interpolation method.

It should be understood that, in the technical solution provided by the present disclosure, a target backlight brightness range [$L_{min}$, $L_{max}$] may first be determined with reference to the ambient brightness, and then the target backlight brightness range [$L_{min}$, $L_{max}$] may be matched to M preset gray levels through the interpolation method, where M is an integer greater than 2. For example, the target backlight brightness range [$L_{min}$, $L_{max}$] is determined, such that the corresponding brightness of the first gray level is $L_{min}$, and the corresponding brightness of the M gray level is $L_{max}$. M−2 interpolation points may be between the brightness $L_{min}$ and the brightness $L_{max}$. The brightness of the first gray level . . . the j gray level . . . the M gray level after the interpolation processing may be $L_{min}$ . . . (j−1)*($L_{max}$−$L_{min}$)/(M−1) . . . $L_{max}$ accordingly.

It should be noted that other methods may also be used to match the target backlight brightness range to the plurality of gray levels of the light-emitting region, which may not be limited according to the embodiments of the present disclosure.

Figure 11:
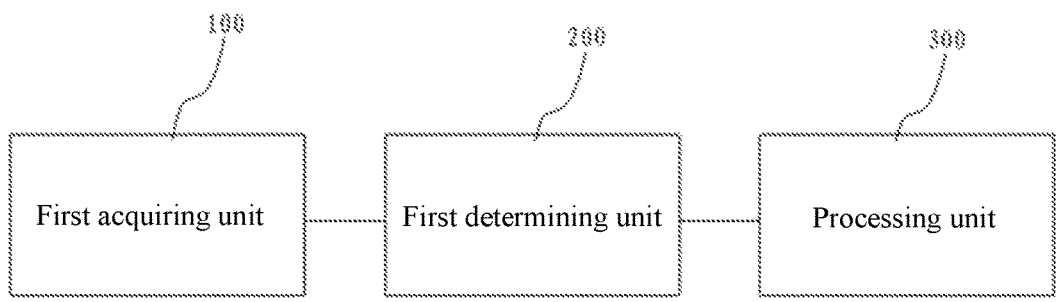
FIG. 11 illustrates a structural schematic of a backlight drive device according to exemplary embodiments of the present disclosure.

Referring to FIG. 11, FIG. 11 illustrates a structural schematic of a backlight drive device according to exemplary embodiments of the present disclosure. The backlight drive device may be configured to drive the light-emitting region of the backlight source of the display device. The backlight drive device may include a first acquiring unit 100, a first determining unit 200, and a processing unit 300.

The first acquiring unit 100 may be configured to acquire the actual ambient brightness of the ambient where the display device is located.

The first determining unit 200 may be configured to determine the target backlight brightness range of the light exited from the light-emitting region with reference to the actual ambient brightness, where the target backlight brightness range may be within the intrinsic brightness range of the light-emitting region.

The processing unit 300 may be configured to match the target backlight brightness range to the plurality of gray levels preset in the light-emitting region.

It should be noted that the intrinsic brightness range of the light-emitting region provided by the embodiments of the present disclosure may be a set maximum light-emitting brightness range of the light-emitting region, which may be determined according to parameters, such as the type of the light-emitting element forming the light-emitting region and the like. The brightness value of the light-emitting region may not be limited by the present disclosure and may be the intrinsic brightness at shipment.

In one embodiment of the present disclosure, the actual ambient brightness provided by the present disclosure may be obtained by multiplexing a sensing device, such as a brightness sensor configured by the display device itself, and the like. The actual ambient brightness may also be the brightness of the ambient light obtained by a sensing device, such as a brightness sensor configured independently, and the like.

It should be understood that the backlight drive solution provided by the embodiments of the present disclosure may adjust the backlight brightness range of the light-emitting region by referring to the actual ambient brightness, and further optimize the backlight brightness range of the light exited from the light-emitting region under the actual ambient brightness, which may ensure a high light-exiting brightness effect of the ambient where the display device is located, improve the adjustment flexibility of the backlight brightness range of the light-emitting region, and achieve the objective of self-adaptive adjustment of the backlight brightness range of the light exited from the light-emitting region according to the actual ambient brightness.

Figure 12:
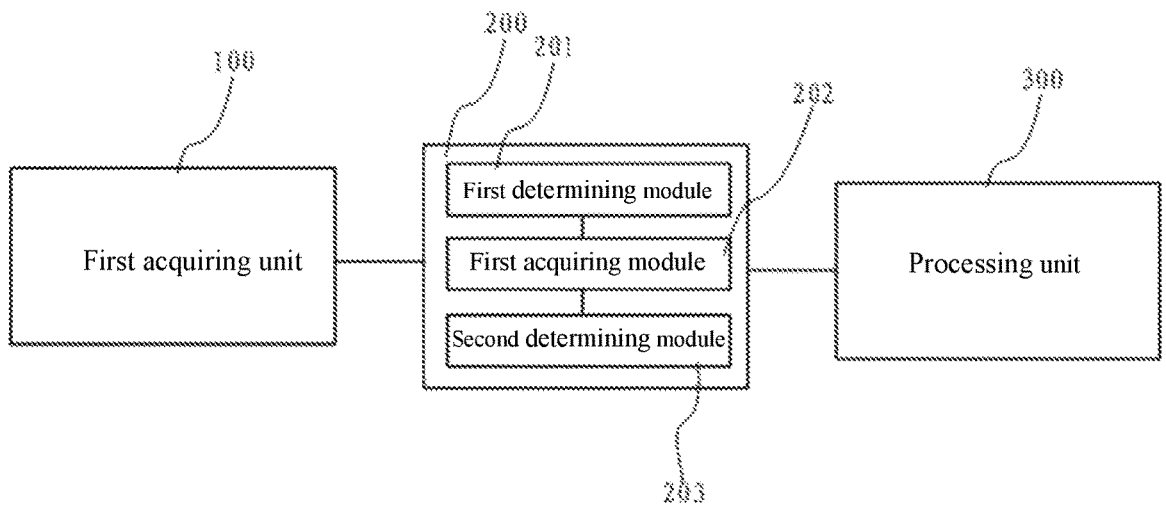
FIG. 12 illustrates a structural schematic of another backlight drive device according to exemplary embodiments of the present disclosure.

In one embodiment of the present disclosure, when determining the target backlight brightness range with reference to the actual ambient brightness, different backlight brightness ranges corresponding to different ambient brightness adjustment levels may be preset by the present disclosure, and the ambient brightness adjustment level with which the actual ambient brightness falls may be determined, thereby determining the backlight brightness range corresponding to the ambient brightness adjustment level as the target backlight brightness range. Referring to FIG. 12, FIG. 12 illustrates a structural schematic of another backlight drive device according to exemplary embodiments of the present disclosure. The first determining unit 200 may include a first determining module 201, a first acquiring module 202, and a second determining module 203.

The first determining module 201 may be configured to determine that the actual ambient brightness is in an i-th adjustment brightness range, where the i-th adjustment brightness range is between a first adjustment brightness range and an N-th adjustment brightness range. N is an integer greater than or equal to 2, and i is a positive integer less than or equal to N.

The first acquiring module 202 may be configured to acquire an i-th backlight brightness range [L0, Li] corresponding to the i-th adjustment brightness range. Adjustment brightness ranges, ranging from the first adjustment brightness range to the N-th adjustment brightness range, and backlight brightness ranges, ranging from a first backlight brightness range to an N-th backlight brightness range, have a one-to-one correspondence. The adjustment brightness ranges increase sequentially from the first adjustment brightness range to the N-th adjustment brightness range and extreme values L increase sequentially from an extreme value L1 in the first backlight brightness range to an extreme value $L_N$ in the N-th backlight brightness, where L0 is greater than or equal to 0.

The second determining module 203 may be configured to determine the i-th backlight brightness range [$L_0$, Li] as the target backlight brightness range.

It should be understood that the first adjustment brightness range to the N-th adjustment brightness range provided by the embodiments of the present disclosure may be equivalent to the ambient brightness adjustment levels; each adjustment brightness range may correspond to a backlight brightness range; and a final target backlight brightness range may be determining the adjustment brightness range within which the actual ambient brightness falls.

Taking N=3 as example, a first adjustment bright range to a third adjustment brightness range may be set to correspond to a low ambient brightness level, a medium ambient brightness level, and a high ambient brightness level; if the intrinsic backlight brightness range of the light-emitting region is [0, 1000 nits], a first backlight brightness range may be set as [0, 300 nits], a second backlight brightness range may be set as [0, 500 nits], and a third backlight brightness range may be set as [0, 1000 nits]; after acquiring the actual ambient brightness, it may determine that the actual ambient brightness falls within the lower ambient brightness level; furthermore, the first backlight brightness range [0, 300 nits] may be determined to be the target backlight brightness range, and then the target backlight brightness range of [0, 300 nits] may be matched to a plurality of gray levels preset in the light-emitting region. If the acquired actual ambient brightness changes again, the target backlight brightness range may be re-determined according to updated actual ambient brightness, and then the newly determined target backlight brightness range may be re-matched to the plurality of gray levels preset in the light-emitting region.

Figure 13:
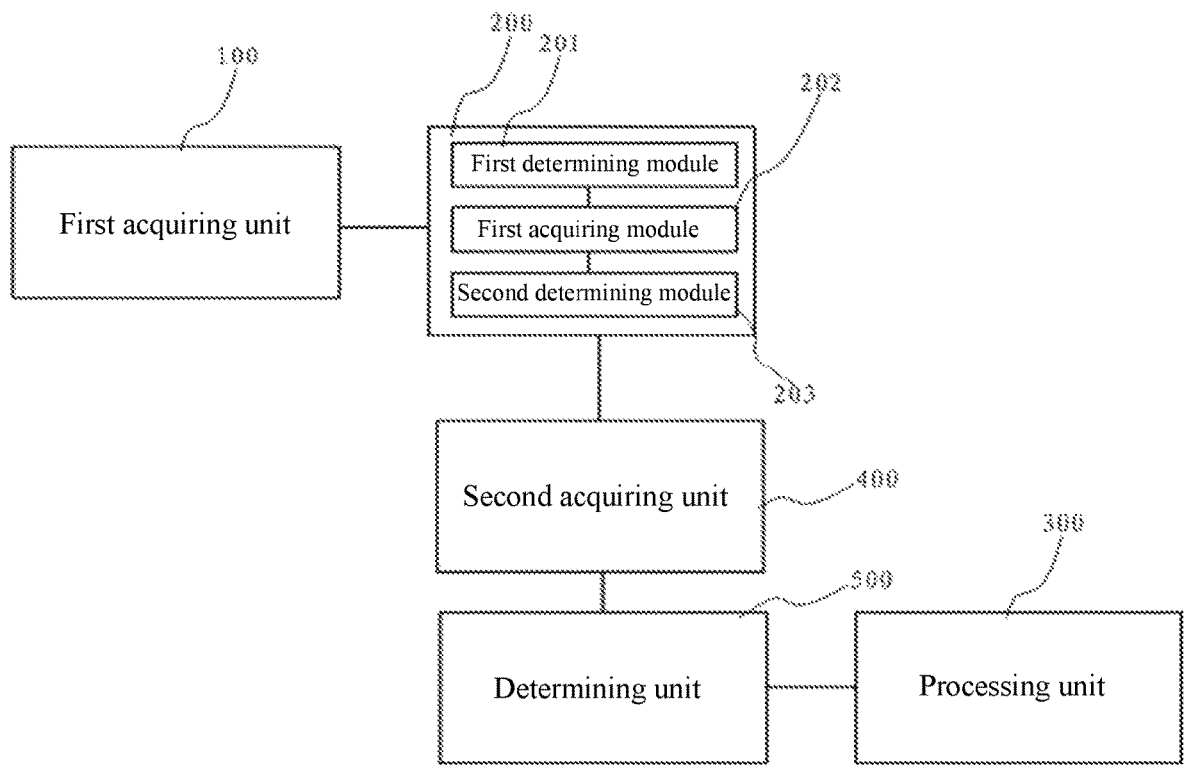
FIG. 13 illustrates a structural schematic of another backlight drive device according to exemplary embodiments of the present disclosure.

In one embodiment of the present disclosure, after determining the target backlight brightness range by determining the ambient brightness adjustment level with which the actual ambient brightness falls, the target backlight brightness range may also be verified to determine whether it fits human eye visual characteristics, which may ensure that the reproduced image and the original image have a same contrast and a same brightness level for the human eyes under different ambient light, thereby providing same display experience. Referring to FIG. 13, FIG. 13 illustrates a structural schematic of another backlight drive device according to exemplary embodiments of the present disclosure. The backlight drive device may further include a second acquiring unit 400 and a determining unit 500.

The second acquiring unit 400 may be configured to, after determining the target backlight brightness range and before matching the target backlight brightness range to the plurality of gray levels preset in the light-emitting region, acquire the brightness perception range of the human eyes according to Weber-Fehner law and the actual ambient brightness.

The determining unit 500 may be configured to determine whether the target backlight brightness range is within the brightness perception range. If yes, the target backlight brightness range may be matched to the plurality of gray levels preset in the light-emitting region. If no, a brightness extreme value in the target backlight brightness range exceeding the brightness perception range may be replaced with a brightness extreme value in the brightness perception range accordingly, and the replaced target backlight brightness range may be matched to the plurality of gray levels preset in the light-emitting region.

It should be understood that the relative brightness perception of the human eyes for a same actual brightness is different in different brightness ambient. Therefore, the brightness perception range of the human eyes may be obtained by Weber-Fehner law and the actual ambient brightness, and whether the minimum brightness and the maximum brightness in the target backlight brightness range exceed the brightness perception range may be determined. If not, the target backlight brightness range may be determined to fit the perception brightness of the human eye, and the current target backlight brightness range may be matched to the plurality of gray levels in the light-emitting region. If the minimum brightness in the target backlight brightness range exceeds the brightness perception range, the minimum brightness in the target backlight brightness range may be replaced with the minimum brightness in the brightness perception range; if the maximum brightness in the target backlight brightness range exceeds the brightness perception range, the maximum brightness in the target backlight brightness range may be replaced with the minimum brightness in the brightness perception range; and the updated target backlight brightness range may be matched to the plurality of gray levels in the light-emitting region.

Figure 14:
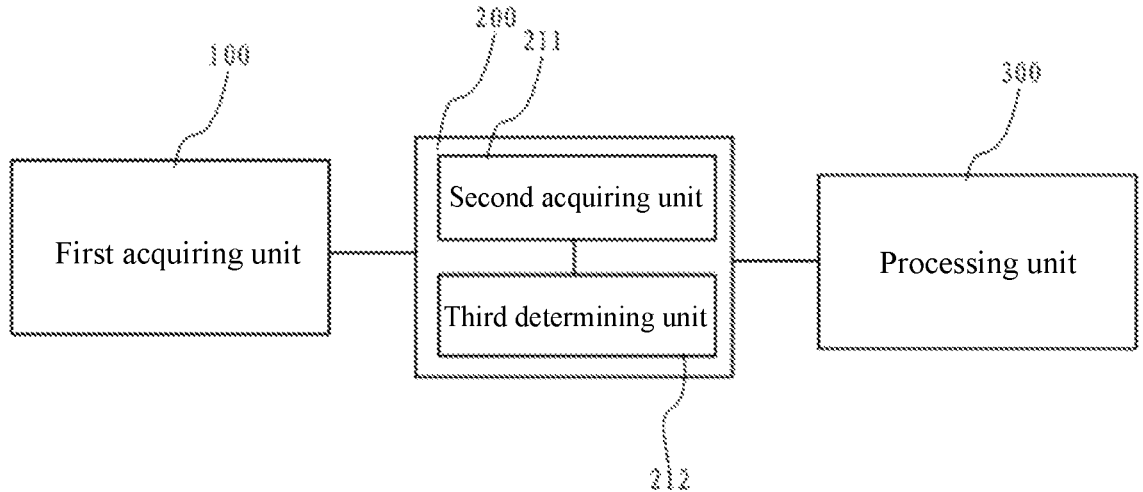
FIG. 14 illustrates a structural schematic of another backlight drive device according to exemplary embodiments of the present disclosure.

In one embodiment of the present disclosure, the brightness distribution range of the human eyes may be directly determined as the target backlight brightness range. Referring to FIG. 14, FIG. 14 illustrates a structural schematic of another backlight drive device according to exemplary embodiments of the present disclosure. The first determining unit 200 may include a second acquiring module 211 and a third determining module 212.

The second acquiring module 211 may be configured to acquire the brightness perception range of the human eyes according to Weber-Fehner law and the actual ambient brightness.

The third determining module 212 may be configured to determine the brightness perception range as the target backlight brightness range.

It should be understood that the relative brightness perception of the human eyes for a same actual brightness is different in different brightness ambient. Therefore, the brightness perception range of the human eyes may be obtained by Weber-Fehner law and the actual ambient brightness, and the brightness perception range may be determined as the target backlight brightness range corresponding to the light-emitting region at the current target ambient brightness. For example, when the actual ambient brightness acquired during the daytime is 10,000 nits, the brightness perception range of the human eyes obtained by Weber-Fehner law and the actual ambient brightness may be [200 nits-20000 nits], and then the brightness perception range [200 nits-20000 nits] may be determined as the target backlight brightness range to match the plurality of gray levels of the light-emitting region; when the actual ambient brightness acquired during the nighttime is 30 nits, the brightness perception range of the human eyes obtained by Weber-Fehner law and the actual ambient brightness may be [1 nit-200 nits], and then the brightness perception range [1 nit-200 nits] may be determined as the target backlight brightness range to match the plurality of gray levels of the light-emitting region.

Figure 15:
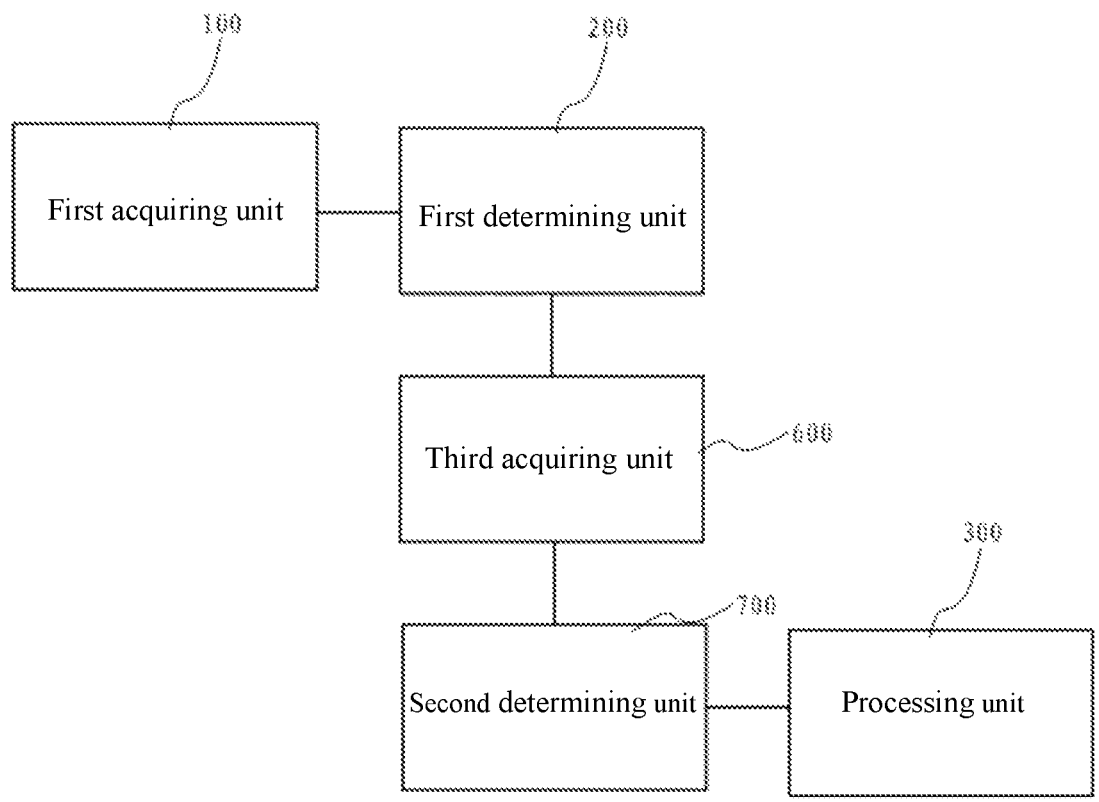
FIG. 15 illustrates a structural schematic of another backlight drive device according to exemplary embodiments of the present disclosure.

In one embodiment of the present disclosure, the plurality of preset gray levels of the light-emitting region provided by the present disclosure may be a preset fixed-number gray levels, that is, the quantity of gray levels may not change with factors, such as the target backlight brightness range and the like. Or, the quantity of the plurality of preset gray levels may be divided according to the maximum brightness in the target backlight brightness range; the greater the maximum brightness in the target backlight brightness range is, the greater the quantity of gray levels is. For example, the mapping relationship between different backlight brightness ranges and the quantity of gray levels may be preset; after determining the target backlight brightness range in different backlight brightness ranges, the quantity of gray levels corresponding to the target backlight brightness range may be determined. Or, the quantity of the plurality of preset gray levels may also be dynamically adjusted according to different displayed images. Referring to FIG. 15, FIG. 15 illustrates a structural schematic of another backlight drive device according to exemplary embodiments of the present disclosure. The backlight drive device may further include a third acquiring unit 600 and a second determining unit 700.

The third acquiring unit 600 may be configured to, before matching the target backlight brightness range to the plurality of gray levels preset in the light-emitting region, acquire the image information of the image displayed by the display device.

The second determining unit 700 may be configured to determine the quantity of gray levels of the light-emitting region according to the size of the image information.

It should be understood that the process of determining the quantity of gray levels provided by the embodiments of the present disclosure may be performed after determining the target brightness range and before matching the target backlight brightness range to the plurality of preset gray levels of the light-emitting region. The quantity of gray levels corresponding to the light-emitting region may be determined by judging the complexity of the image displayed in the portion of the display device corresponding to the light-emitting region. That is, the image information of the image displayed in the display device corresponding to the light-emitting region may be judged, and the quantity of gray levels of the light-emitting region may be determined according to the size of image information. The quantity of gray levels of the light-emitting region may be positively correlated with the size of image information. The more the image information is, the more the quantity of gray levels is; and the less the image information is, the less the quantity of gray levels is. If the image displayed in the display device corresponding to the light-emitting region may only be an arrow indicator, the image information may be relatively small, such that a relatively small quantity of gray levels may be set. For example, the quantity of gray levels may be 32 or less. If the image displayed in the display device corresponding to the light-emitting region may only be a navigation image and the like, the image information may be relatively large, such that a relatively large quantity of gray levels may be set. For example, the quantity of gray levels may be 256 or more.

In one embodiment of the present disclosure, the mapping relationship between the size of the image information and the quantity of the gray levels may be preset in the present disclosure. Furthermore, the mapping relationship may be searched through means including table look-up and the like to determine the quantity of the gray levels corresponding to the image information, thereby improving efficiency.

It should be understood that the quantity of the gray levels provided by the embodiments of the present disclosure may be divided according to the maximum brightness of the target backlight brightness range or the size of the image information, thereby being capable of optimizing the quantity of the gray levels in the current target backlight brightness range; and on the basis of adaptively adjusting the target backlight brightness range according to the actual ambient brightness, the drive solution may be capable of adaptively adjusting the quantity of the gray levels to further improve the backlight drive effect.

The quantity of the gray levels of the light-emitting region provided by the embodiments of the present disclosure may not be infinitely increased and may require analysis by combining factors, such as the type and the drive method of the light-emitting element, and the like. For example, the light-emitting element provided by the embodiments of the present disclosure may be driven by a pulse modulation signal. The pulse width time of the pulse modulation signal is linearly related to the brightness of the light-emitting element. That is, the longer the light-emitting element is turned on, the greater the brightness is. Furthermore, the quantity of the gray levels may be determined according to the total pulse width time and the stepwise pulse width time of the pulse modulation signal. The pulse width unit may be in the order of microseconds or milliseconds. For example, the total pulse width time of the pulse modulation signal may be 256 microseconds, and the stepwise pulse width may be 1 microsecond, such that the maximum quantity of the gray levels may be 256. Otherwise, the corresponding pulse width time difference between two adjacent gray levels may be less than 1 microsecond, so that the brightness between two adjacent gray levels may not be differentiated.

The light-emitting element group and its drive circuit provided by the embodiments of the present disclosure are described with reference to the drawings in detail hereinafter. Referring to FIG. 6, FIG. 6 illustrates a structural schematic of the light-emitting region according to exemplary embodiments of the present disclosure. The light-emitting region may include one switch transistor T and one light-emitting element group DL. The light-emitting element group DL may include at least one light-emitting element DL1. A first electrode of the light-emitting element group DL may be electrically connected to a first voltage V1, and a second electrode of the light-emitting element group DL may be electrically connected to a first terminal of the switch transistor T. A second terminal of the switch transistor T may be electrically connected to a second voltage V2, and a gate electrode of the switch transistor T may be electrically connected to a pulse modulation signal PWM. The pulse width time of the pulse modulation signal PWM may have a linear relationship with the brightness of the light-emitting element group DL (e.g., the schematic of the linear relationship between the pulse width time and the brightness shown in FIG. 7). The processing unit may be configured to match the backlight brightness range to the plurality of gray levels in the light-emitting region and realize brightness corresponding to the plurality of gray levels by controlling different pulse width times of the pulse modulation signal.

As shown in FIG. 6, when the light-emitting element group DL provided by the embodiments of the present disclosure includes a plurality of light-emitting elements DL1, the plurality of light-emitting elements DL1 may be electrically connected in series. Or, as shown in FIG. 8, FIG. 8 illustrates a structural schematic of another light-emitting region according to exemplary embodiments of the present disclosure. When the light-emitting element group includes the plurality of light-emitting elements DL1, the plurality of the light-emitting elements DL1 may be divided into a plurality of groups, all groups may be electrically connected in parallel, and the light-emitting elements DL1 in each group may be electrically connected in series, which may not be limited according to the embodiments of the present disclosure. The light-emitting elements DL1 in the light-emitting element group DL may also be connected using other electrical connection manners, which may require specific design according to actual applications.

It should be understood that the pulse width time of the pulse modulation signal provided by the embodiments of the present disclosure may have the linear relationship with the brightness of the light-emitting element. That is, the luminous brightness of the light-emitting element=k* the pulse width time of the pulse modulation signal, where k is a positive number. Furthermore, the luminous brightness of the light-emitting element may be adjusted by controlling the pulse width time of the pulse modulation signal, thereby implementing the objective that the corresponding brightness of different gray levels in the light-emitting region may be adjusted by the adjusted pulse width time. For example, the correspondence relationship between the luminous brightness and the pulse width time of the light-emitting element group may be shown in FIG. 7, where $t_{max}$ is the maximum pulse width time, $L_{max}$ is the luminous brightness corresponding to the maximum pulse width time, and $t_j$ belongs to $t_{max}$. If the target backlight brightness range is determined to be [0, $L_j$], the target backlight brightness range [0, $L_j$] may be matched to the preset plurality of gray levels. The quantity of the gray levels may need to be determined with reference to the total pulse width time $t_j$ and the stepwise pulse width time, which may ensure that the absolute value of the difference in pulse width time of the brightness values corresponding to two adjacent gray levels is a positive integer multiple of the stepwise pulse width time.

In one embodiment of the present disclosure, the switch transistor may be the MOS switch transistor or the TFT switch transistor and the like. The light-emitting element may be a light-emitting diode and the like. For example, the light-emitting element may be a mini-LED or micro-LED. The plurality of the light-emitting elements included in the light-emitting region may be arranged in any manner, which may not be limited according to the embodiments of the present disclosure. The first electrode of the light-emitting element group provided in the embodiments of the present disclosure may be an anode, and the provided first voltage V1 may be the PVDD terminal; the second electrode of the light-emitting element group may be a cathode, and the provided second voltage V2 may be the PVEE terminal. The first voltage may be greater than the second voltage. The first voltage and the second voltage may be provided by an external power supply, and the pulse modulation signal PWM may be provided by a drive chip.

Furthermore, the backlight source provided by the embodiments of the present disclosure may include more light-emitting regions, and each light-emitting region may be independently controlled, such that the objective of light-emitting region division of the backlight source and independent divided region control may be implemented, thereby improving the flexibility of the backlight source to drive light-emitting. Referring to FIG. 9, FIG. 9 illustrates a structural schematic of the backlight source according to exemplary embodiments of the present disclosure. The backlight source may include a plurality of light-emitting regions S which may be arranged in an M*N array. For example, the plurality of light-emitting regions may be arranged in a matrix. Each light-emitting region may include the structure shown in FIG. 6 or FIG. 8, and an independent pulse modulation signal PWM may be connected to each light-emitting region S. Therefore, by controlling different pulse modulation signals PWM, the objective of light-emitting region division and independent divided region control may be implemented, the objective of reducing the brightness of the light-emitting region corresponding to the portion required to display a low brightness picture may be implemented, and the objective of increasing the brightness of the light-emitting region corresponding to the portion required to display a high brightness picture may also be implemented. For example, the backlight source provided by the present disclosure may include the plurality of the light-emitting regions, and the processing unit may independently drive all light-emitting regions by controlling the respective pulse modulation signals connected to the switch transistors of all light-emitting region accordingly.

Figure 16:
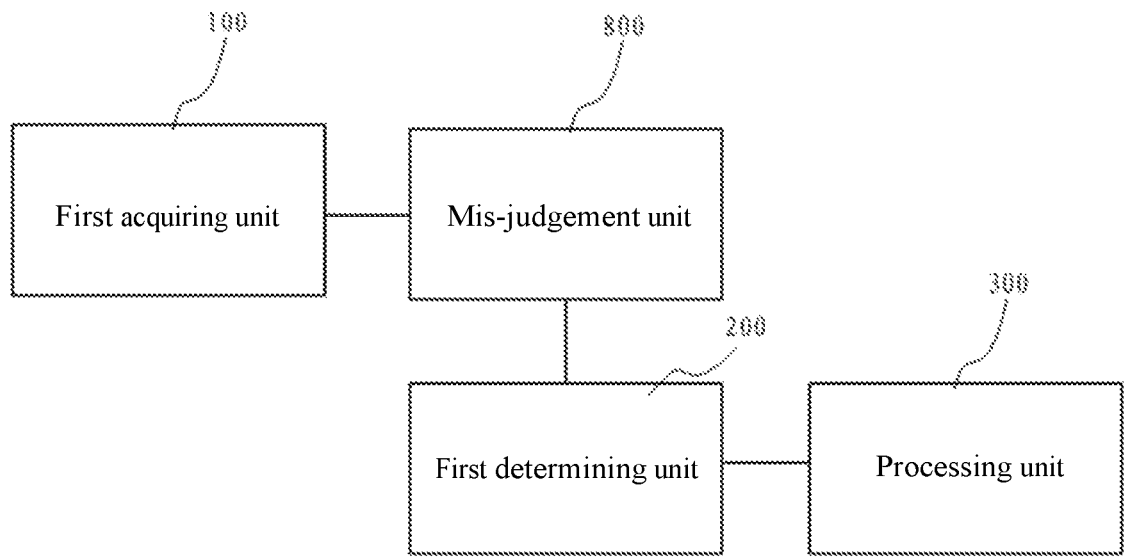
FIG. 16 illustrates a structural schematic of another backlight drive device according to exemplary embodiments of the present disclosure.

Referring to FIG. 16, FIG. 16 illustrates a structural schematic of another backlight drive device according to exemplary embodiments of the present disclosure. The backlight drive device may further include a misjudgement unit 800. The misjudgement unit 800 may be configured to, after acquiring the actual ambient brightness and before determining the target backlight brightness range, determine whether the duration of the current actual ambient brightness is greater than a preset time. If yes, the target backlight brightness range of the light-emitting region may be determined with reference to the actual ambient brightness. If no, a mis-operation may be determined.

It should be understood that, after acquiring the actual ambient brightness, the backlight drive method provided by the present disclosure may determine the duration of the actual ambient brightness. If the duration is determined to be greater than the preset time, it may be determined that the ambient where the display device is located has changed, and corresponding subsequent steps of the backlight drive method may be performed. If the duration is determined to be not greater than the preset time, it may be determined that a user holding the display device may experience a short time of ambient change or other mis-operations, and the like on the display device, such that the mis-operation may be determined and the current state of the display device may be unchanged.

The embodiments of the present disclosure further provide a backlight source system accordingly. The backlight source system may include the backlight drive device provided in any one of the above-mentioned embodiments.

Figure 17:
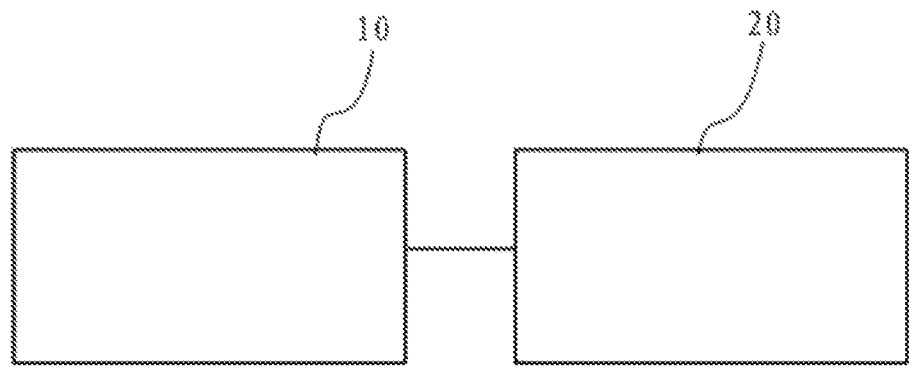
FIG. 17 illustrates a structural schematic of a backlight source system according to exemplary embodiments of the present disclosure.

Referring to FIG. 17, FIG. 17 illustrates a structural schematic of the backlight source system according to exemplary embodiments of the present disclosure. The backlight source system may include a backlight source 10, including light-emitting regions, and a backlight drive device 20 which is electrically connected to the backlight source 10 in any one of the above-mentioned embodiments.

The embodiments of the present disclosure further provide a display device accordingly. The display device may include the backlight source system provided in any one of the above-mentioned embodiments. For example, the display device may include the liquid crystal display panel and the backlight source system provided in any one of the above-mentioned embodiments. The backlight source system may provide backlight to the liquid crystal display panel.

Figure 18:
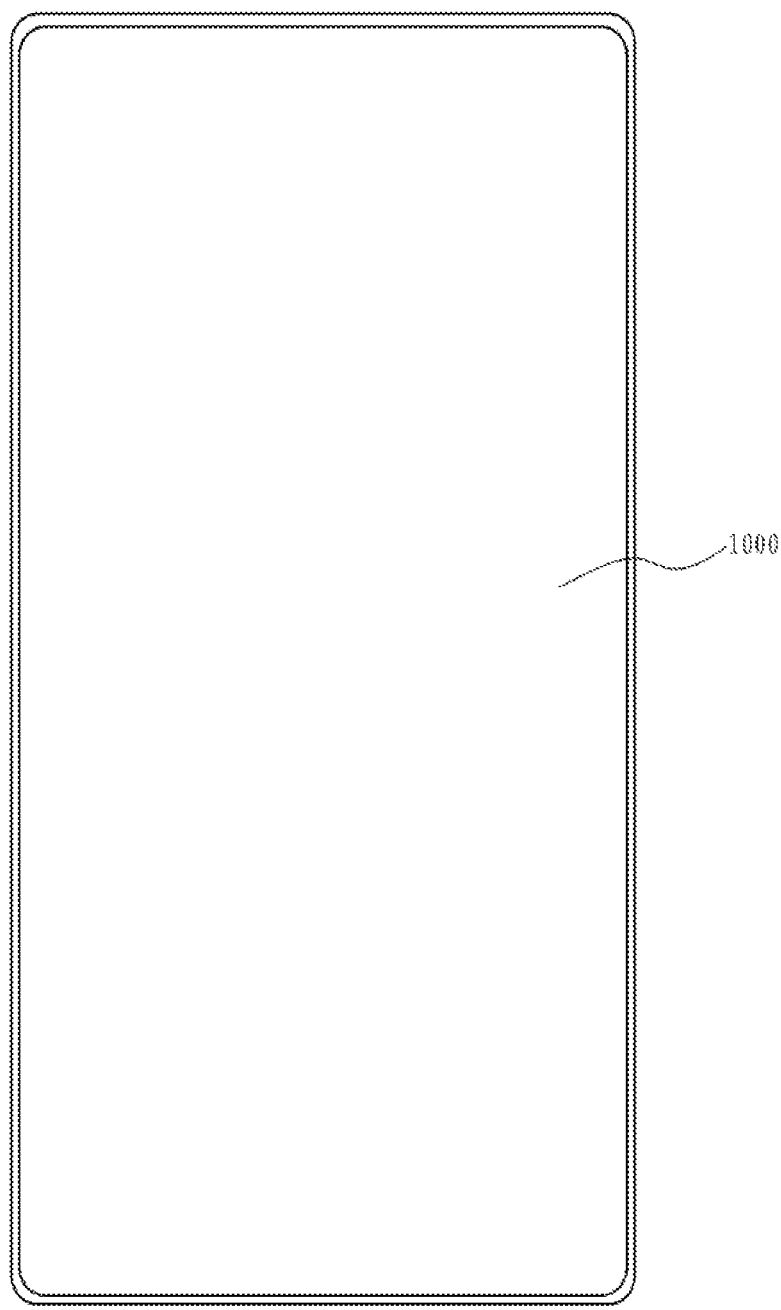
FIG. 18 illustrates a structural schematic of a display device according to exemplary embodiments of the present disclosure.

Referring to FIG. 18, FIG. 18 illustrates a structural schematic of the display device according to exemplary embodiments of the present disclosure.

It should be noted that the display device provided by the embodiment of the present disclosure may also be a notebook, a tablet computer, a computer, a wearable device, and the like, which may not be limited according to the embodiments of the present disclosure.

From the above-mentioned embodiments, it can be seen that the drive circuit and its drive method and the display device provided by the present disclosure may achieve at least the following beneficial effects.

The embodiments of the present disclosure provide a backlight drive method, a backlight drive device, a backlight source system, and a display device. The drive solution may be configured to drive the light-emitting region of the backlight source of the display device. Driving the light-emitting region of the backlight source may include acquiring the actual ambient brightness of the ambient where the display device is located, determining the target backlight brightness range of the light exited from the light-emitting region with reference to the actual ambient brightness, where the target backlight brightness range may be within the intrinsic brightness range of the light-emitting region, and matching the target backlight brightness range to the plurality of gray levels preset in the light-emitting region. The backlight drive solution provided by the embodiments of the present disclosure may adjust the backlight brightness range of the light-emitting region by referring to the actual ambient brightness, and further optimize the backlight brightness range of the light exited from the light-emitting region under the actual ambient brightness, which may ensure a high light-exiting brightness effect of the ambient where the display device is located, improve the adjustment flexibility of the backlight brightness range of the light-emitting region, and achieve the objective of self-adaptive adjustment of the backlight brightness range of the light exited from the light-emitting region according to the actual ambient brightness.

The above-mentioned description of the disclosed embodiments enables those skilled in the art to implement or use the present disclosure. Various modifications to the above-mentioned embodiments may be apparent to those skilled in the art, and the general principles defined herein may be implemented in other embodiments without departing from the spirit or scope of the present disclosure. Therefore, the present disclosure may not be limited to the embodiments shown in the specification but should conform to the widest scope consistent with the principles and novel features disclosed in the specification.

What is claimed is:
1. A backlight drive method for driving a backlight source of a drive device, comprising:
    driving a light-emitting region of the backlight source, including:
        acquiring actual ambient brightness of an ambient where a display device is located;

determining a target backlight brightness range of light exited from the light-emitting region with reference to the actual ambient brightness, wherein the target backlight brightness range is within a brightness range of the light-emitting region; and matching the target backlight brightness range to a plurality of gray levels preset in the light-emitting region.

2. The method according to claim 1, wherein determining the target backlight brightness range of the light exited from the light-emitting region with reference to the actual ambient brightness includes:

determining the actual ambient brightness is in an i-th adjustment brightness range, wherein the i-th adjustment brightness range is between a first adjustment brightness range and an N-th adjustment brightness range, and wherein N is an integer greater than or equal to 2 and i is a positive integer less than or equal to N;

acquiring an i-th backlight brightness range [$L_0$, Li] corresponding to the i-th adjustment brightness range, wherein adjustment brightness ranges, ranging from the first adjustment brightness range to the N-th adjustment brightness range, and backlight brightness ranges, ranging from a first backlight brightness range to an N-th backlight brightness range, have a one-to-one correspondence; the adjustment brightness ranges increase sequentially from the first adjustment brightness range to the N-th adjustment brightness range and extreme values L increase sequentially from an extreme value L1 in the first backlight brightness range to an extreme value $L_N$ in the N-th backlight brightness, wherein $L_0$ is greater than or equal to 0; and determining the i-th backlight brightness range [$L_0$, Li] as the target backlight brightness range.

3. The method according to claim 2, wherein, after determining the target backlight brightness range and before matching the target backlight brightness range to the plurality of gray levels preset in the light-emitting region, the method further includes:

acquiring a brightness perception range of human eyes according to Weber-Fehner law and the actual ambient brightness; and determining whether the target backlight brightness range is within the brightness perception range, wherein:

if yes, the target backlight brightness range is matched to the plurality of gray levels preset in the light-emitting region; and if no, a brightness extreme value in the target backlight brightness range exceeding the brightness perception range is replaced with a brightness extreme value in the brightness perception range accordingly, and the replaced target backlight brightness range is matched to the plurality of gray levels preset in the light-emitting region.

4. The method according to claim 1, wherein determining the target backlight brightness range of the light exited from the light-emitting region with reference to the actual ambient brightness includes:

acquiring a brightness perception range of human eyes according to Weber-Fehner law and the actual ambient brightness; and determining the brightness perception range as the target backlight brightness range.

5. The method according to claim 1, wherein before matching the target backlight brightness range to the plurality of gray levels preset in the light-emitting region, the method further includes:

acquiring image information of an image displayed by the display device; and determining a quantity of gray levels of the light-emitting region according to a size of the image information.

6. The method according to claim 1, wherein:

the light-emitting region includes a switch transistor and a light-emitting element group including at least one light-emitting element;

a first electrode of the light-emitting element group is electrically connected to a first voltage; a second electrode of the light-emitting element group is electrically connected to a first terminal of the switch transistor; a second terminal of the switch transistor is electrically connected to a second voltage; a gate electrode of the switch transistor is electrically connected to a pulse modulation signal; and a pulse width time of the pulse modulation signal has a linear relationship with brightness of the light-emitting element group; and brightness corresponding to each of the plurality of gray levels is realized by controlling different pulse width times of the pulse modulation signal.

7. The method according to claim 6, wherein:

the backlight source includes a plurality of light-emitting regions; and a drive method of the plurality of light-emitting regions includes driving all light-emitting regions independently by controlling respective pulse modulation signals connected to switch transistors of all light-emitting region accordingly.

8. The method according to claim 1, wherein after acquiring the actual ambient brightness and before determining the target backlight brightness range, the method further includes:

determining whether a duration of current actual ambient brightness is greater than a preset time, wherein:

if yes, the target backlight brightness range of the light exited from the light-emitting region is determined with reference to the actual ambient brightness; and if no, a mis-operation is determined.

9. The method according to claim 1, wherein matching the target backlight brightness range to the plurality of gray levels preset in the light-emitting region includes:

matching the target backlight brightness range to the plurality of gray levels preset in the light-emitting region through an interpolation method.

10. A backlight drive device, configured to drive a backlight source of a display device, comprising:

a first acquiring unit, a first determining unit, and a processing unit, wherein:

the first acquiring unit is configured to acquire actual ambient brightness of an ambient wherein the display device is located;

the first determining unit is configured to determine a target backlight brightness range of light exited from the light-emitting region with reference to the actual ambient brightness, wherein the target backlight brightness range is within a brightness range of the light-emitting region; and the processing unit is configured to match the target backlight brightness range to a plurality of gray levels preset in the light-emitting region.

11. The device according to claim 10, wherein:

the first determining unit includes a first determining module, a second determining module, and a first acquiring module, wherein:

the first determining module is configured to determine the actual ambient brightness is in an i-th adjustment brightness range, wherein the i-th adjustment brightness range is between a first adjustment brightness range and an N-th adjustment brightness range, and wherein N is an integer greater than or equal to 2 and i is a positive integer less than or equal to N;

the second determining module is configured to acquire an i-th backlight brightness range [$L_0$, Li] corresponding to the i-th adjustment brightness range, wherein adjustment brightness ranges, ranging from the first adjustment brightness range to the N-th adjustment brightness range, and backlight brightness ranges, ranging from a first backlight brightness range to an N-th backlight brightness range, have a one-to-one correspondence; the adjustment brightness ranges increase sequentially from the first adjustment brightness range to the N-th adjustment brightness range and extreme values L increase sequentially from an extreme value L1 in the first backlight brightness range to an extreme value $L_N$ in the N-th backlight brightness, wherein $L_0$ is greater than or equal to 0; and the first acquiring module is configured to determine the i-th backlight brightness range [$L_0$, Li] as the target backlight brightness range.

12. The device according to claim 11, further including:
a second acquiring unit and a determining unit, wherein:
    after determining the target backlight brightness range and before matching the target backlight brightness range to the plurality of gray levels preset in the light-emitting region, the second acquiring unit is configured to acquire a brightness perception range of human eyes according to Weber-Fehner law and the actual ambient brightness; and
the determining unit is configured to determine whether the target backlight brightness range is within the brightness perception range, wherein:
    if yes, the target backlight brightness range is matched to the plurality of gray levels preset in the light-emitting region; and
    if no, a brightness extreme value in the target backlight brightness range exceeding the brightness perception range is replaced with a brightness extreme value in the brightness perception range accordingly, and the replaced target backlight brightness range is matched to the plurality of gray levels preset in the light-emitting region.

13. The device according to claim 10, wherein:
the first determining unit includes a second acquiring module and a third determining module, wherein:
    the second acquiring module is configured to acquire a brightness perception range of human eyes according to Weber-Fehner law and the actual ambient brightness; and
    the third determining module is configured to determine the brightness perception range as the target backlight brightness range.

14. The device according to claim 10, further including:
a third acquiring unit and a second determining unit, wherein:
    before matching the target backlight brightness range to the plurality of gray levels preset in the light-emitting region, the third acquiring unit is configured to acquire image information of an image displayed by the display device; and the second determining unit is configured to determine a quantity of gray levels of the light-emitting region according to a size of the image information.

15. The device according to claim 10, wherein:
the light-emitting region includes a switch transistor and a light-emitting element group including at least one light-emitting element;
a first electrode of the light-emitting element group is electrically connected to a first voltage; a second electrode of the light-emitting element group is electrically connected to a first terminal of the switch transistor; a second terminal of the switch transistor is electrically connected to a second voltage; a gate electrode of the switch transistor is electrically connected to a pulse modulation signal; and a pulse width time of the pulse modulation signal has a linear relationship with brightness of the light-emitting element group; and
the processing unit is configured to match the backlight brightness range to the plurality of gray levels in the light-emitting region and realize brightness corresponding to each of the plurality of gray levels by controlling different pulse width times of the pulse modulation signal.

16. The device according to claim 15, wherein:
the backlight source includes a plurality of light-emitting regions, and the processing unit is configured to drive all light-emitting regions independently by controlling respective pulse modulation signals connected to switch transistors of all light-emitting regions accordingly.

17. The device according to claim 16, wherein:
the plurality of light-emitting regions is arranged in an array.

18. The device according to claim 10, further including:
a misjudgement unit, wherein:
    after acquiring the actual ambient brightness and before determining the target backlight brightness range, the misjudgement unit is configured to determine whether a duration of current actual ambient brightness is greater than a preset time, wherein:
    if yes, the target backlight brightness range of the light exited from the light-emitting region is determined with reference to the actual ambient brightness; and
    if no, a mis-operation is determined.

19. A display device, comprising:
the backlight drive device, comprising:
a first acquiring unit, a first determining unit, and a processing unit, wherein:
    the first acquiring unit is configured to acquire actual ambient brightness of an ambient wherein the display device is located;
    the first determining unit is configured to determine a target backlight brightness range of light exited from the light-emitting region with reference to the actual ambient brightness, wherein the target backlight brightness range is within a brightness range of the light-emitting region; and
    the processing unit is configured to match the target backlight brightness range to a plurality of gray levels preset in the light-emitting region.

* * * * *